(12) United States Patent
Ueno et al.

(10) Patent No.: US 10,065,362 B2
(45) Date of Patent: Sep. 4, 2018

(54) JOINING METHOD (71) Applicant: TOYOTA JIDOSHA KABUSHIKI KAISHA, Toyota-shi, Aichi-ken (JP)

(72) Inventors: Yasuhiro Ueno, Miyoshi (JP); Takaaki Kiyono, Okazaki (JP); Hideo Nakamura, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 180 days.

(21) Appl. No.: 15/128,176

(22) PCT Filed: Mar. 27, 2015

(86) PCT No.: PCT/IB2015/000458
§ 371 (c)(1),
(2) Date: Sep. 22, 2016

(87) PCT Pub. No.: WO2015/145251
PCT Pub. Date: Oct. 1, 2015

(65) Prior Publication Data
US 2017/0129161 A1    May 11, 2017

(30) Foreign Application Priority Data

Mar. 27, 2014 (JP) ................................. 2014-064946

(51) Int. Cl.
*B32B 37/00* (2006.01)
*B29C 65/06* (2006.01)
(Continued)

(52) U.S. Cl.
CPC .......... *B29C 65/0681* (2013.01); *B29C 65/08* (2013.01); *B29C 66/324* (2013.01); *B29C 66/341* (2013.01); *B29C 66/721* (2013.01)

(58) Field of Classification Search
CPC ... B29C 65/06; B29C 65/0681; B29C 66/324; B29C 66/341; B29C 66/721
(Continued)

(56) References Cited

U.S. PATENT DOCUMENTS

| | | | |
|---|---|---|---|
| 2007/0044406 A1 | 3/2007 | Van Aken et al. | |
| 2008/0156411 A1* | 7/2008 | Manicke | B29C 65/0681 156/73.5 |

(Continued)

FOREIGN PATENT DOCUMENTS

| | | | |
|---|---|---|---|
| CN | 103406659 A | 11/2013 | |
| JP | 2003-145625 A | 5/2003 | |

(Continued)

*Primary Examiner* — James Sells
(74) *Attorney, Agent, or Firm* — Sughrue Mion, PLLC (57) ABSTRACT A joining method for joining together a first member in which fiber material is mixed into a first resin, and a second member that includes at least a second resin, includes abutting the first member and the second member together, and softening or melting the first resin of the first member and the second resin of the second member that are adjacent to abutting surfaces of the first member and the second member; and stirring a joint forming portion formed by the softened or melted first resin of the first member and the softened or melted second resin of the second member, and the fiber material included in the softened or melted first resin of the first member, in a direction inclined with respect to the abutting surfaces, and hardening the joint forming portion.

5 Claims, 3 Drawing Sheets (51) Int. Cl.
*B29C 65/00* (2006.01)
*B29C 65/08* (2006.01)

(58) Field of Classification Search
USPC .......................................... 156/73.5
See application file for complete search history.

(56) References Cited

U.S. PATENT DOCUMENTS

2012/0328837 A1* 12/2012 Goehlich ........... B23K 20/1255
428/156
2014/0064830 A1* 3/2014 Nagano .................. B29C 66/21
403/270
2014/0069986 A1 3/2014 Okada et al.

FOREIGN PATENT DOCUMENTS

JP 2008-162280 A 7/2008
JP 2013-043370 A 3/2013

* cited by examiner

JOINING METHOD

BACKGROUND OF THE INVENTION

1. Field of the Invention

The invention relates to a joining method, more particularly, a joining method for joining together fiber-reinforced resin members in which reinforcing fiber material is mixed into a matrix resin, for example.

2. Description of Related Art

Methods that use vibration, ultrasonic waves, friction between resin members, and heat plates, for example, are known as methods for joining fiber-reinforced resin members in which reinforcing fiber material such as glass fiber or carbon fiber is included in resin (matrix resin) or a resin member made of thermoplastic resin.

However, with all of these methods, the joining surfaces are pressed together with a predetermined pressure while the area near the joining surfaces is melted, so burr is generated at the joint portion, which is problematic. Also, the fiber-reinforced resin material is strong against stress in a direction parallel to the direction of orientation of the fibers, and weak against stress in a direction orthogonal to the direction of orientation of the fibers. Therefore, although it is desirable to orient the fibers in the direction orthogonal to the joining surface when joining these kinds of fiber-reinforced resin members together, if the members are pressed on in the direction orthogonal to the joining surface when they are joined together as described above, the fibers near the joining surface will be oriented so that they become parallel to the joining surface, which is problematic.

To counter this kind of problem, Japanese Patent Application Publication No. 2003-145625 (JP 2003-145625 A) describes a joining method for fiber-reinforced resin members that enables high joint strength to be obtained while suppressing the generation of burr.

The joining method for fiber-reinforced thermal flexible resin members described in JP 2003-145625 A is a method in which at least one of a first thermoplastic resin member and a second thermoplastic resin member is made of fiber-reinforced resin, and which involves first abutting the first thermoplastic resin member and the second thermoplastic resin member together, and then pressing a rotating probe against a surface portion of the first thermoplastic resin member and the second thermoplastic resin member that includes a predetermined portion of a surface boundary line between the first thermoplastic resin member and the second thermoplastic resin member, and moving the probe along the surface boundary line.

According to the joining method for fiber-reinforced thermal flexible resin members described in JP 2003-145625 A, the fibers in the thermoplastic resin members that have melted at a front portion of the probe are caught by the rotation of the probe, such that their orientation changes. The fibers then harden while oriented in a direction substantially orthogonal to the abutting surface of the abutting portion at a rear portion of the probe, thereby enabling the join strength of the members to be increased.

However, in the joining method of fiber-reinforced thermal flexible resin members described in JP 2003-145625 A, the rotating probe is pressed against the surface portion of the first thermoplastic resin member and the second thermoplastic resin member, and moved along the surface boundary line thereof. Therefore, the direction of orientation of the fibers inside the first thermoplastic resin member and the second thermoplastic resin member is unable to be changed, so the problem in which the joint strength of the members is unable to be sufficiently increased may remain.

SUMMARY OF THE INVENTION

The invention thus provides a joining method capable of effectively increasing the joint strength between resin members, when joining together resin members, at least one of which is made of fiber-reinforced resin in which reinforcing fiber material is mixed into the resin.

One aspect of the invention relates to a joining method for joining together a first member in which fiber material is mixed into a first resin, and a second member that includes at least a second resin. This joining method includes abutting the first member and the second member together, softening or melting the first resin of the first member and the second resin of the second member that are adjacent to abutting surfaces of the first member and the second member, and stirring a joint forming portion formed by the softened or melted first resin of the first member and the softened or melted second resin of the second member, and the fiber material included in the softened or melted first resin of the first member, in a direction inclined with respect to the abutting surfaces, and hardening the joint forming portion.

Here, in the aspect described above, when stirring and hardening the joint forming portion, the joint forming portion may be stirred in a direction orthogonal to the abutting surfaces.

According to this aspect, the joint forming portion that is formed by the first resin of the first member and the second resin of the second member that has softened or melted in a region adjacent to the abutting surfaces of the first member and the second member, and fiber material included in the softened or melted first resin of the first member, is stirred in a direction inclined with respect to the abutting surfaces, more specifically, a direction orthogonal to the abutting surfaces, and is hardened. Therefore, the fiber material of the first member included in the joint forming portion is able to be oriented in a direction inclined with respect to the abutting surfaces of the first member and the second member, more specifically, in a direction orthogonal to those abutting surfaces, and hardened. As a result, the joint strength between the first member and the second member is able to be dramatically increased.

Here, the first resin and the second resin that form the first member and the second member may be either a thermosetting resin or a thermoplastic resin. Some examples of thermosetting resin are epoxy resin, phenol resin, and melamine resin. An example of thermoplastic resin is one or two or more types of an admixture such as polypropylene (PP), polyethylene (PE), polystyrene (PS), AS resin, ABS resin, polyvinyl chloride (PVC), methacryl resin, polyamide (PA), polyester, polyacetal (POM), polycarbonate (PC), polyethylene terephthalate (PET), polybutylene terephthalate (PBT), polymethylmethacrylate (PMMA), polyvinylidene fluoride, polyphenylene oxide, polyphenylene sulfide, polyether ether ketone, liquid crystal polymer, polyetherimide, polyether sulfone, polyamide-imide, and thermoplastic epoxy resin, and the like. Also, a blend resin, graft resin, or copolymer with the thermoplastic resin as its main component, e.g., an ethylene-vinyl chloride copolymer, a vinyl acetate-ethylene copolymer, a vinyl acetate-vinyl chloride copolymer, a urethane-vinyl chloride copolymer, acrylic acid-modified polypropylene, or maleic acid-modified polyethylene may also be introduced.

Also, an example of the fiber materials that form the first resin member is one or two or more types of an admixture of ceramic fiber such as boron, alumina, silicon carbide, silicon nitride, or zirconia, inorganic fiber such as glass fiber or carbon fiber, metallic fiber such as copper, steel, aluminum, or stainless steel, and organic fiber such as polyamide, polyester, or cellulose.

Also, in the aspect described above, when stirring the joint forming portion in the direction orthogonal to the abutting surfaces, a stirring member may be inserted into the joint forming portion, the inserted stirring member may be moved in the direction orthogonal to the abutting surfaces, and the joint forming portion may be stirred in the direction orthogonal to the abutting surfaces.

According to this aspect, the fibers of the first member included in the joint forming portion are able to be easily and reliably oriented in the direction orthogonal to the abutting surfaces of the first member and the second member by moving the stirring member that has been inserted into the joint forming portion in the direction orthogonal to the abutting surfaces and stirring the joint forming portion in the direction orthogonal to the abutting surfaces.

Also, in the aspect described above, when inserting the stirring member into the joint forming portion, the stirring member may be made to contact a facing surface of the first member that faces the abutting surfaces or a facing surface of the second member that faces the abutting surfaces, the first resin of the first member and the second resin of the second member may be softened or melted from the facing surface of the first member or the facing surface of the second member by the stirring member, and the stirring member may be inserted into the joint forming portion.

According to this aspect, the first resin of the first member and the second resin of the second member are softened or melted from the facing surface of the first member or the facing surface of the second member by the stirring member that has been placed in contact with the facing surface of the first member that faces the abutting surface or the facing surface of the second member that faces the abutting surface, and the stirring member is inserted into the joint forming portion. As a result, the first resin of the first member and the second resin of the second member can be softened or melted using the stirring member that stirs the joint forming portion, and the stirring member can be relatively easily inserted into the joint forming portion.

Also, when softening or melting the first resin of the first member and the second resin of the second member, the stirring member may be rotated around a rotational axis that is parallel to the direction orthogonal to the abutting surfaces. Also, the first resin of the first member and the second resin of the second member may be softened or melted and the stirring member may be inserted into the joint forming portion, while moving the stirring member into the first member and the second member from the facing surface of the first member or the facing surface of the second member.

According to this aspect, the first resin of the first member and the second resin of the second member are softened or melted and the stirring member that rotates around the rotational axis that is parallel to the direction orthogonal to the abutting surfaces is inserted into the joint forming portion, while moving the stirring member into the first member and the second member from the facing surface of the first member or the facing surface of the second member. As a result, the size of the joint forming portion is able to be made relatively large near the tip end portion of the stirring member, due to the heat generated at the tip end portion of the stirring member from the friction between the stirring member and the first member or the second member, so when the joint forming portion hardens, the joint strength between the first member and the second member is able to be further increased due to the anchor effect thereof.

As can be understood from the description above, according to the foregoing aspect of the invention, when joining together resin members, at least one of which is made from fiber-reinforced resin in which fiber material is mixed into resin, the fibers of the first member included in a joint forming portion, which is made of the first resin of the first member and the second resin of the second member that have been softened or melted in a region adjacent to the abutting surfaces of the first member and the second member, and the fiber material included in the first resin of the first member, are able to be oriented in a desired direction by stirring the joint forming portion in a direction inclined with respect to the abutting surfaces, more specifically, in a direction orthogonal to the abutting surfaces, and hardening the joint forming portion.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, example embodiments of the joining method of the invention will be described with reference to the accompanying drawings.

Figure 1A:
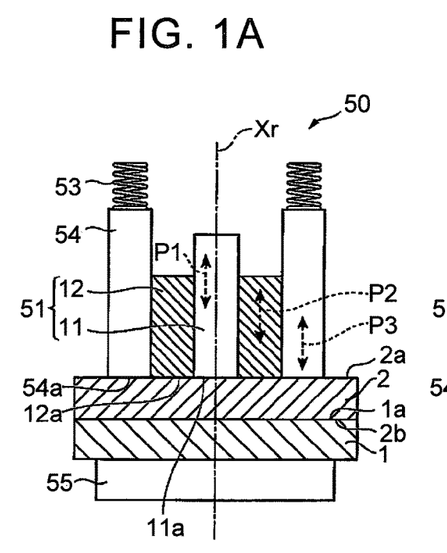
FIG. 1A is a longitudinal sectional view illustrating an example embodiment of a joining method of the invention, and illustrates an arranging process in this method.
Figure 1B:
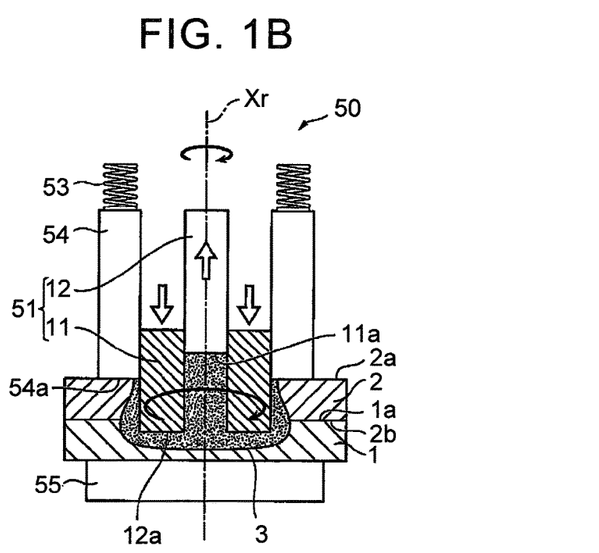
FIG. 1B is a longitudinal sectional view illustrating the example embodiment of the joining method of the invention, and illustrates a push-in process in this method.
Figure 1C:
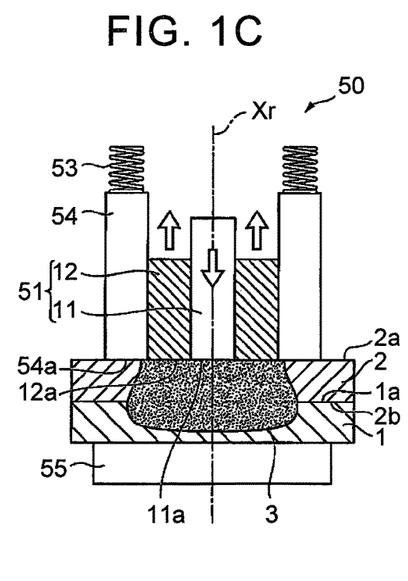
FIG. 1C is a longitudinal sectional view illustrating the example embodiment of the joining method of the invention, and illustrates a pullout process in this method.
Figure 1D:
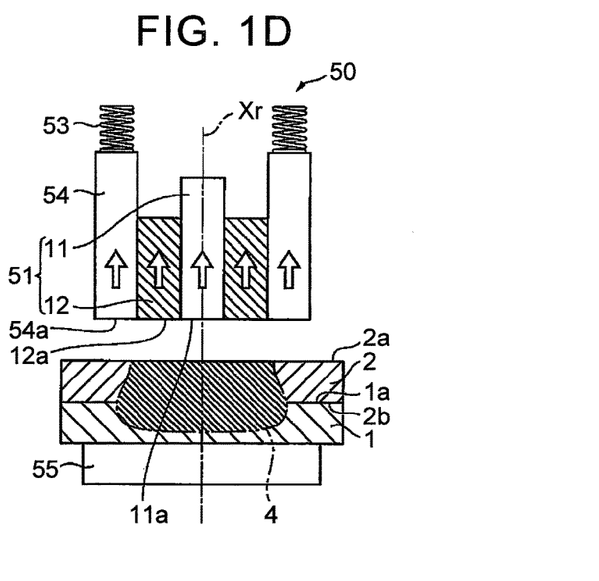
FIG. 1D is a longitudinal sectional view illustrating the example embodiment of the joining method of the invention, and illustrates a removal process in this method.

FIG. 1 is a longitudinal view illustrating one example embodiment of the joining method of the invention, with FIG. 1A being a view of an arranging process, FIG. 1B being a view of a push-in process, FIG. 1C being a view of a pullout process, and FIG. 1D being a view of a removal process.

<Friction Stir Welding Apparatus Used in this Example Embodiment of the Joining Method of the Invention>

The joining method according to this example embodiment of the invention is carried out using a double action type friction stir welding apparatus as a representative example of the friction stir welding apparatus. Therefore, first the representative example of the double action type Friction Stir Welding (FSW) apparatus used with the joining method according to this example embodiment will be outlined with reference to FIG. 1A.

As shown in FIG. 1A, the FSW apparatus 50 used with the joining method according to this example embodiment mainly includes a rotating jig portion (a stirring member) 51, a clamp member 54, and a backing member 55, as well as a supporting member, not shown in FIG. 1A, that supports these, and a driving mechanism, also not shown in FIG. 1A, that drives the rotating jig portion 51, and the like. The clamp member 54 is fixed via a spring 53 to the supporting member that is not shown.

The rotating jig portion (the stirring member) 51 includes a pin member 11 and a shoulder portion 12. The pin member 11 has a generally circular cylindrical shape, and is configured to rotate around an axis (rotational axis) Xr by the driving mechanism, not shown, and be able to move relative to the shoulder portion 12 in the direction of the broken arrow P1, i.e., the direction of the axis Xr (the vertical direction in FIG. 1A). The shoulder portion 12 has a generally circular cylindrical shape that has a void. The pin member 11 is inserted in this void. The shoulder portion 12 is supported by the supporting member, not shown, on the outside of the pin member 11 so as to surround the pin member 11. This shoulder portion 12 is configured to rotate around the same axis Xr as the pin member 11 by the driving member, not shown, and be able to move relative to the pin member 11 (i.e., move in the same direction as the pin member 11 or in the opposite direction from the pin member 11), in the direction of the broken arrow P2, i.e., the direction of the axis Xr. Therefore, the pin member 11 and the shoulder portion 12 that form the rotating jig portion 51 are each configured to rotate together as a single unit around the axis Xr, as well as be able to move (in the same direction or in opposite directions) relative to one another in the direction of the axis Xr.

The clamp member 54 is provided to the outside of the shoulder portion 12 of the rotating jig portion 51, and has a generally circular cylindrical shape that has a void, similar to the shoulder portion 12. The shoulder portion 12 is inserted inside of this void. Therefore, the substantially circular cylindrical-shaped shoulder portion 12 is positioned on the outer periphery of the pin member 11, and the substantially circular cylindrical-shaped clamp member 54 is positioned on the outer periphery of this shoulder portion 12. In other words, the clamp member 54, the shoulder portion 12, and the pin member 11 form a coaxially nested structure. This clamp member 54 is supported by the supporting member, not shown, via the spring 53 so as to push on processing material (a fiber-reinforced resin member 1 and a resin member 2) from one surface (i.e., the upper surface of the resin member 2 in FIG. 1A). Therefore, the clamp member 54 is configured to be able to move in the direction of the broken arrow P3, i.e., the direction of the axis Xr, in a state urged to the forming material side.

The pin member 11 and the shoulder portion 12 that form the rotating jig portion 51 include an abutting surface 11a and an abutting surface 12a, respectively, and the clamp member 54 includes an abutting surface 54a. These abutting surfaces 11a, 12a, and 54a move in the direction of the Xr axis by the driving mechanism, not shown, and abut against one surface of the processing material.

Also, the backing member 55 is provided in a position facing the clamp member 54 and the rotating jig portion 51, and abuts against the other surface of the processing material (i.e., the lower surface of the fiber-reinforced resin member 1 in FIG. 1A).

The specific structure of the rotating jig portion 51 in this example embodiment is not limited to the structure described above. A well-known structure in the field of FSW may be used as appropriate. Also, the backing member 55 may also be omitted from the FSW apparatus 50. Also, the friction stir welding apparatus is not limited to the FSW apparatus 50 having the structure described above, and may also be a single action type friction stir welding apparatus that includes only the pin member 11. Further, this friction stir welding apparatus may have the clamp member 54 to the outside of the pin member 11, or may have other members and the like not described with the FSW apparatus 50 described above.

<Joining Method Using the Friction Stir Welding Apparatus>

Next, a joining method using the FSW apparatus 50 according to this example embodiment will be outlined with reference to FIG. 1. Hereinafter, a method for joining mainly the fiber-reinforced resin member 1 made of fiber-reinforced resin in which fiber material is mixed into resin (a matrix resin) to the resin member 2 made of only resin that does not include fiber material will be described, but both of the members to be joined together may of course also include reinforcing fiber material. Further, below, a method that involves placing the resin member 2 on top of the fiber-reinforced resin member 1, making the rotating jig portion 51 of the FSW apparatus 50 contact the upper surface of the resin member 2, and inserting the rotating jig portion 51 from the resin member 2 side will be described, but the rotating jig portion 51 of the FSW apparatus 50 may of course also be inserted from the fiber-reinforced resin member 1 side. Moreover, a mode for joining two resin members (i.e., the fiber-reinforced resin member 1 and the resin member 2) together will be described, but three or more resin members may of course be overlapped and joined together, as long as at least one of the members is a fiber-reinforced resin member made of fiber-reinforced resin.

The joining method according to this example embodiment mainly includes an arranging process, a push-in process, a pullout process, and a removal process, as shown in FIG. 1.

First, in the arranging process, as shown in FIG. 1A, the generally flat plate-shaped resin member (second member) 2 is placed on (arranged abutted against) the generally flat plate-shaped fiber-reinforced resin member (first member) 1, and the fiber-reinforced resin member 1 and the resin member 2 are set in the FSW apparatus 50 such that an upper surface (facing surface) 2a of the resin member 2 abuts against the abutting surfaces 11a, 12a, and 54a of the pin member 11, the shoulder portion 12, and the clamp member 54, respectively. Here, the backing member 55 is supported by the supporting member, not shown, and the fiber-reinforced resin member 1 and the resin member 2 are sandwiched between the clamp member 54 and the backing member 55.

Here, resin (matrix resin) that forms the fiber-reinforced resin member 1 may be either thermosetting resin or thermoplastic resin. Some examples of thermosetting resin are epoxy resin, phenol resin, and melamine resin. An example of thermoplastic resin is one or two or more types of an admixture such as polypropylene (PP), polyethylene (PE), polystyrene (PS), AS resin, ABS resin, polyvinyl chloride (PVC), methacryl resin, polyamide (PA), polyester, polyacetal (POM), polycarbonate (PC), polyethylene terephthalate (PET), polybutylene terephthalate (PBT), polymethylmethacrylate (PMMA), polyvinylidene fluoride, polyphenylene oxide, polyphenylene sulfide, polyether ether ketone, liquid crystal polymer, polyetherimide, polyether sulfone, polyamide-imide, and thermoplastic epoxy resin, and the like. Also, a blend resin, graft resin, or copolymer with the thermoplastic resin as its main component, e.g., an ethylene-vinyl chloride copolymer, a vinyl acetate-ethylene copolymer, a vinyl acetate-vinyl chloride copolymer, a urethane-vinyl chloride copolymer, acrylic acid-modified polypropylene, or maleic acid-modified polyethylene or the like may also be introduced.

Also, an example of the fiber material that forms the fiber-reinforced resin member 1 is one or more types of an admixture of ceramic fiber such as boron, alumina, silicon carbide, silicon nitride, or zirconia, inorganic fiber such as glass fiber or carbon fiber, metallic fiber such as copper, steel, aluminum, or stainless steel, and organic fiber such as polyamide, polyester, or cellulose.

Also, the same resin as the resin that forms the fiber-reinforced resin member 1 described above may be applied as the resin that forms the resin member 2, but from the viewpoint of adhesion to the fiber-reinforced resin member 1, it is preferable to apply a resin of which properties such as the linear expansion coefficient and Young's modulus are equivalent to those of the resin that forms the fiber-reinforced resin member 1.

Next, in the push-in process, as shown in FIG. 1B, the pin member 11 is moved upward in the direction of the axis Xr while the shoulder portion 12 is moved downward by a predetermined amount in the direction of the axis Xr (e.g., is moved down to near the abutting surfaces of the fiber-reinforced resin member 1 and the resin member 2, or to below these abutting surfaces), while the pin member 11 and the shoulder portion 12 are rotated together as a unit around the axis Xr. The resin of the fiber-reinforced resin member 1 and the resin of the resin member 2 adjacent to the abutting surfaces of the fiber-reinforced resin member 1 and the resin member 2 (i.e., an upper surface 1a of the fiber-reinforced resin member 1 and a lower surface 2b of the resin member 2) are softened or melted from the upper surface (the facing surface) 2a side of the resin member 2 by friction heat generated between the surface and the like of the resin member 2 and the abutting surfaces 11a and 12a of the pin member 11 and the shoulder portion 12.

Figure 2:
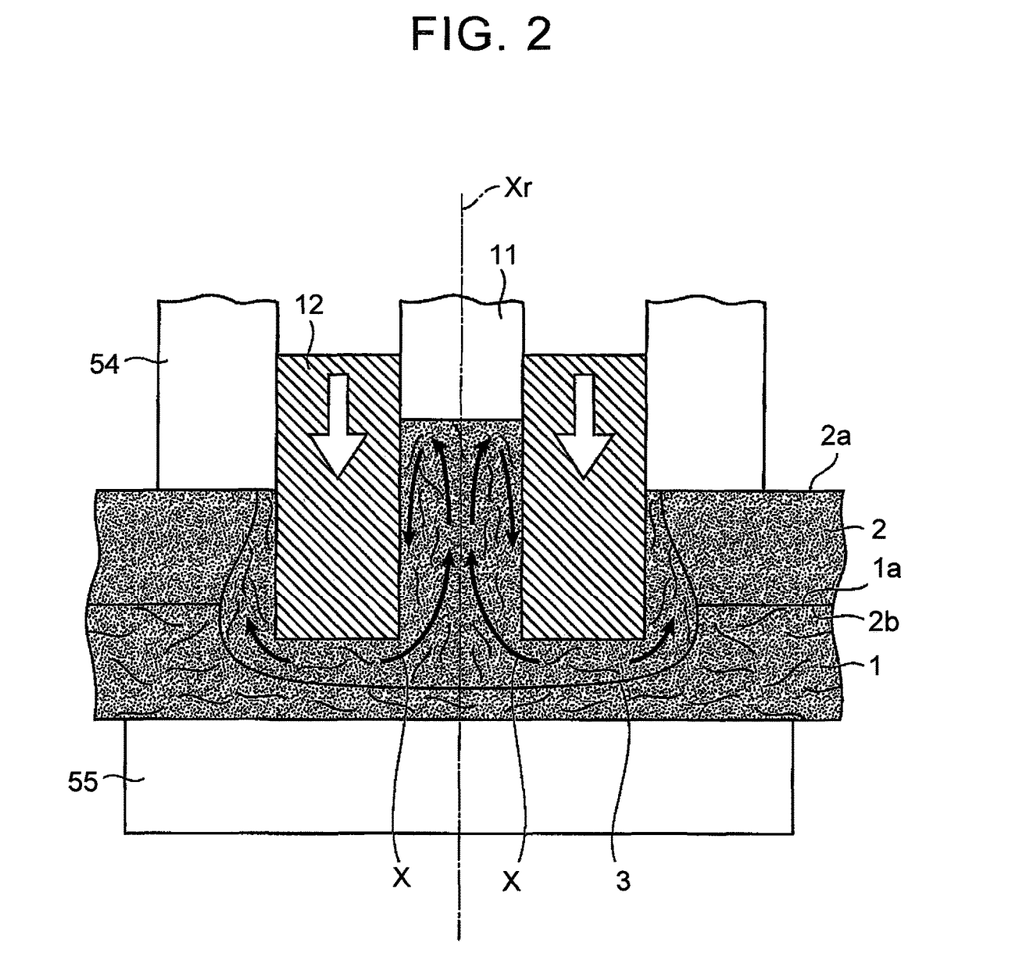
FIG. 2 is a longitudinal sectional view showing a frame format of the internal structure of a first member and a second member shown in FIG. 1B.

In this way, the pin member 11 is moved upward in the direction of the axis Xr while the shoulder portion 12 is moved downward in the direction of the axis Xr, while the pin member 11 and the shoulder portion 12 of the rotating jig portion 51 are rotated together as a unit around the axis Xr. As a result, a joint forming portion (i.e., a portion that can become a joint portion that joins the fiber-reinforced resin member 1 and the resin member 2 together) 3 that is formed by the softened or melted resin of the fiber-reinforced resin member 1 and the resin of the resin member 2, and the fiber material in the softened or melted resin of the fiber-reinforced resin member 1, is formed, and this joint forming portion 3 is stirred in the up-down direction (i.e., a direction orthogonal to the abutting surfaces of the fiber-reinforced resin member 1 and the resin member 2). Therefore, as shown in FIG. 2, the resin of the fiber-reinforced resin member 1 and the resin of the resin member 2 and the like included in the joint forming portion 3 flow in the direction of arrow X within the joint forming portion 3, so the fibers in the fiber-reinforced resin member 1 included in the joint forming portion 3 come to be oriented in the up-down direction.

Also, the shoulder portion 12 is moved downward in the direction of the axis Xr while being rotated around the axis Xr, and is inserted into the joint forming portion 3. As a result, a tip end portion (a lower end portion) of the shoulder portion 12 is heated more than other portions, by the friction between the shoulder portion 12 and the resin member 2 and the like. Therefore, the size of the joint forming portion 3 (e.g., the cross-sectional area of the joint forming portion 3) becomes relatively larger near the tip end portion of the shoulder portion 12 (i.e., at the lower portion of the joint forming portion 3), as shown in the drawing, due to the heat generated at the tip end portion of the shoulder portion 12.

In order to further increase the size of the lower portion of the joint forming portion 3, the shoulder portion 12 may be kept in this low end position for a predetermined period of time when the shoulder portion 12 is moved in the direction of the axis Xr.

Next, in the pullout process, as shown in FIG. 1C, rotation of the pin member 11 and the shoulder portion 12 is stopped, and the pin member 11 is moved downward in the direction of the axis Xr while the shoulder portion 12 is moved upward a predetermined amount in the direction of the axis Xr, such that the heights of the abutting surface 11a of the pin member 11 and the abutting surface 12a of the shoulder portion 12 are approximately the same. That is, the pin member 11 and the shoulder portion 12 are moved back to their original positions shown in FIG. 1A.

Figure 3:
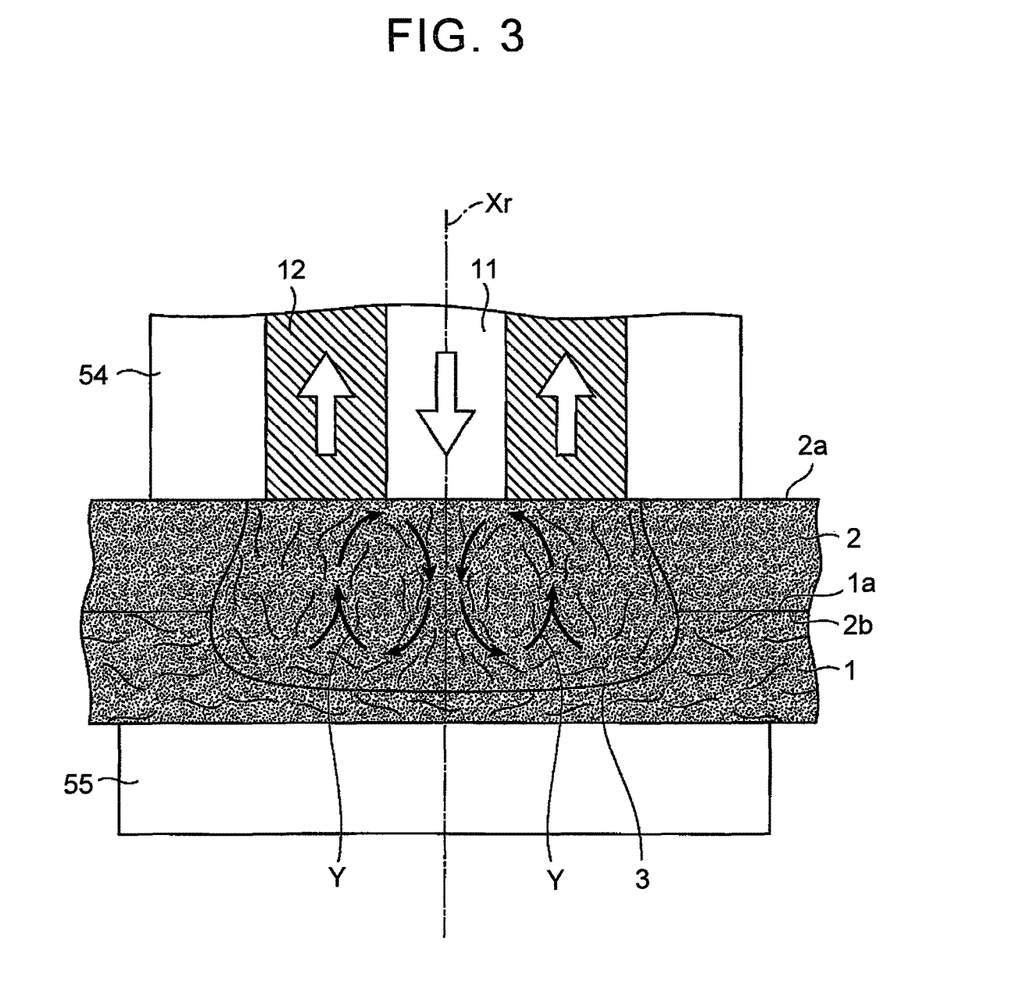
FIG. 3 is a longitudinal sectional view showing a frame format of the internal structure of the first member and the second member shown in FIG. 1C.

In this way, the joint forming portion 3 is further stirred in the up-down direction by moving the pin member 11 downward in the direction of the axis Xr while moving the shoulder portion 12 upward in the direction of the axis Xr. As shown in FIG. 3, the resin of the fiber-reinforced resin member 1 and the resin of the resin member 2 and the like included in the joint forming portion 3 flow in the direction of arrow Y within the joint forming portion 3, so the fibers of the fiber-reinforced resin member 1 included in the joint forming portion 3 become oriented in the vertical direction even more evenly.

Then in the removal process, as shown in FIG. 1D, the FSW apparatus 50 is removed from the fiber-reinforced resin member 1 and the resin member 2 after the resin of the fiber-reinforced resin member 1 and the resin of the resin member 2 included in the joint forming portion 3 is hardened. As a result, the fiber-reinforced resin member 1 and the resin member 2 become integrally joined via a joint portion 4 (i.e., a portion where the resin that forms the fiber-reinforced resin member 1 and the resin that forms the resin member 2 are mixed) formed by the hardened joint forming portion 3.

In this way, according to the joining method of this example embodiment, when joining the fiber-reinforced resin member 1 that is made of fiber-reinforced resin in which fibers are dispersed with a predetermined orientation and mixed into the resin, and the resin member 2 that is made from only resin, the fiber-reinforced resin member 1 and the resin member 2 are arranged abutted together, the resin of the fiber-reinforced resin member 1 and the resin of the resin member 2 that are adjacent to the abutting surfaces of the fiber-reinforced resin member 1 and the resin member 2 are softened or melted, and the joint forming portion 3 made of the softened or melted resin of the fiber-reinforced resin member 1 and the like is stirred in a direction orthogonal to the abutting surfaces and hardened. As a result, the fibers included in the joint forming portion 3 are able to be oriented in a direction orthogonal to the abutting surfaces. Therefore, the joint strength between the fiber-reinforced resin member 1 and the resin member 2, more specifically, the strength in a shearing direction parallel to the abutting surfaces of (the boundary between) the fiber-reinforced resin member 1 and the resin member 2 and the strength in a tensile direction orthogonal to the abutting surfaces of the fiber-reinforced resin member 1 and the resin member 2, is able to be effectively increased.

Also, according to the joining method of this example embodiment, while the fiber-reinforced resin member 1 and the resin member 2 are pushed on by the clamp member 54 of the FSW apparatus 50, the rotating jig portion 51 is slid in the up-down direction inside the clamp member 54, and the joint forming portion 3 and the joint portion 4 are able to be formed in the closed space below the rotating jig portion 51. Therefore, the generation of burr on the joint portion 4 is able to be reliably suppressed (see FIG. 3 for example).

Furthermore, according to the joining method of this example embodiment, the size of the joint forming portion 3, i.e., the lower portion of the joint portion 4 that joins the fiber-reinforced resin member 1 and the resin member 2 together, is able to be relatively large. This anchor effect thus enables the joint strength between the fiber-reinforced resin member 1 and the resin member 2 to be further increased.

In the example embodiment described above, first, the pin member 11 is moved upward in the direction of the axis Xr while the shoulder portion 12 is moved downward in the direction of the Xr, and then the pin member 11 is moved downward in the direction of the Xr while the shoulder portion 12 is moved upward in the direction of the axis Xr. However, as long as the joint forming portion 3 is able to be stirred in the vertical direction (i.e., a direction orthogonal to the abutting surfaces of the fiber-reinforced resin member 1 and the resin member 2), and the resin of the fiber-reinforced resin member 1 and the resin of the resin member 2 and the like included in the joint forming portion 3 are able to flow within the joint forming portion 3, the manner in which the pin member 11 and the shoulder portion 12 of the rotating jig portion 51 move may be changed as appropriate.

Also, in the example embodiment described above, the friction stir welding apparatus is used to join the fiber-reinforced resin member 1 and the resin member 2 together. However, any apparatus may be used as long as it is able to soften or melt the resin of the fiber-reinforced resin member 1 and the resin of the resin member 2, and stir the joint forming portion 3 formed by the softened or melted resin of the fiber-reinforced resin member 1 and the like in a direction orthogonal to the abutting surfaces. For example, the resin of the fiber-reinforced resin member 1 and the resin of the resin member 2 may be softened or melted using heat generated by ultrasonic vibration or a preheated heat plate or the like, instead of friction heat. Also, the joint forming portion 3 may be stirred via a stirring apparatus that is inserted by a suitable method into the joint forming portion 3, instead of the rotating jig portion 51.

Further, in the example embodiment described above, the joint forming portion 3 formed by the softened or melted resin of the fiber-reinforced resin member 1 and the like is stirred in a direction orthogonal to the abutting surfaces, but as long as the joint forming portion 3 is at least stirred in a direction inclined with respect to the abutting surfaces, an effect similar to that of the example embodiment described above can be obtained.

Also, in the example embodiment described above, a method for joining the generally flat plate-shaped fiber-reinforced resin member 1 to the generally flat plate-shaped resin member 2 is described, but the shapes of the members to be joined together may of course be set as appropriate.

While an example embodiment of the invention has been described in detail with reference to the drawings, the specific structure is not limited to this example embodiment. Design changes and the like within the scope of the invention are also included in the invention.

The invention claimed is:

1. A joining method for joining together a first member in which fiber material including fibers is mixed into a first resin, and a second member that includes at least a second resin, the joining method comprising:
   providing a stirring member including a pin member and a shoulder portion in which the pin member is inserted such that the shoulder portion surrounds the pin member, the stirring member configured such that the pin member and the shoulder portion rotate together as a single unit around an axis and are able to move relative to one another in a direction of the axis;
   arranging the first member and the second member such that the first member and the second member abut together;
   softening or melting the first resin of the first member and the second resin of the second member that are adjacent to abutting surfaces of the first member and the second member, inserting the stirring member into a joint forming portion formed by the softened or melted first resin of the first member, the softened or melted second resin of the second member, and the fiber material included in the softened or melted first resin of the first member, and stirring the joint forming portion in a direction orthogonal to the abutting surfaces to orient the fibers included in the joint forming portion in the direction orthogonal to the abutting surfaces, by moving the shoulder portion in a direction toward the abutting surfaces along the direction orthogonal to the abutting surfaces and moving the pin member in a direction away from the abutting surfaces along the direction orthogonal to the abutting surfaces while rotating the pin member and the shoulder portion of the inserted stirring member together as a single unit around the axis;
   stirring the joint forming portion in the direction orthogonal to the abutting surfaces to orient the fibers included in the joint forming portion in the direction orthogonal to the abutting surfaces, by moving the shoulder portion of the stirring member in the direction away from the abutting surfaces along the direction orthogonal to the abutting surfaces and moving the pin member in the direction toward the abutting surfaces along the direction orthogonal to the abutting surfaces, and removing the stirring member from the joint forming portion; and
   hardening the first resin of the first member and the second resin of the second member included in the joint forming portion.

2. The joining method according to claim 1, wherein the stirring member is made to contact a facing surface of the first member that faces the abutting surfaces or a facing surface of the second member that faces the abutting surfaces, the first resin of the first member and the second resin of the second member are softened or melted from the facing surface of the first member or the facing surface of the second member by the stirring member, and the stirring member is inserted into the joint forming portion.

3. The joining method according to claim 2, wherein when softening or melting the first resin of the first member and the second resin of the second member, the stirring member is rotated around a rotational axis that is parallel to the direction orthogonal to the abutting surfaces, and friction heat generated between the first member or the second member, and the stirring member is used.

4. The joining method according to claim 3, wherein the first resin of the first member and the second resin of the second member are softened or melted and the stirring member is inserted into the joint forming portion, while moving the stirring member into the first member and the second member from the facing surface of the first member or the facing surface of the second member.

5. The joining method according to claim 1, wherein the second member also includes fiber material.

* * * * *